United States Patent Office 2,938,889
Patented May 31, 1960

---

2,938,889

POLYMERIZATION OF TETRAFLUOROETHYLENE WITH SELECTED METAL FLUORIDES

Carl George Krespan, Wilmington, Del., assignor to E. I. du Pont de Nemours and Company, Wilmington, Del., a corporation of Delaware No Drawing. Filed June 12, 1957, Ser. No. 665,119

12 Claims. (Cl. 260—87.5)

This invention relates to a new process of preparing fluorocarbon polymers.

Fluorocarbon polymers, i.e., polymers composed exclusively of carbon and fluorine, are becoming increasingly important in the chemical technology. In particular, polytetrafluoroethylene already has a number of industrial uses and is in ever increasing demand. New and improved methods of preparing polytetrafluoroethylene, or copolymers of tetrafluoroethylene with other unsaturated fluorocarbons, are constantly being sought.

This invention is a process of preparing fluorocarbon polymers which comprises bringing in intimate contact at a temperature above 0° C. tetrafluoroethylene, or mixture thereof with a perfluoroolefin having a terminal difluoromethylene, $=CF_2$ group, said mixtures comprising at least 20 mole percent of tetrafluoroethylene, with catalytic amounts of a fluoride of a metal having an oxidation potential greater than that of mercury, the metal in the fluoride being in its highest valency state.

Specifically, the catalysts suitable for use in the process of this invention are the polyfluorides of the metals listed on page 403 of "Preparation, Properties and Technology of Fluorine and Organic Fluoro Compounds," by Slesser and Schram (McGraw-Hill, 1951), in the chapter by Fowler et al., entitled "Vapor-Phase Fluorination Using Metallic Fluorides Other Than Cobalt Trifluoride." The table on page 403 lists the metals (chromium, manganese, cerium, lead, bismuth, cobalt and silver) having oxidation potentials higher than that of mercury. The fluorides of these metals in their highest valency state, which are recognized by Fowler et al. as being active fluorinating agents, are all catalysts for the polymerization of tetrafluoroethylene according to the process of this invention. Thus, suitable catalysts include chromium trifluoride, manganese trifluoride, cerium tetrafluoride, lead tetrafluoride, bismuth pentafluoride, cobalt trifluoride, and silver difluoride. As little as 0.1 mole of catalyst per 100 moles of fluoroolefin is sufficient, although much more can be used if desired, e.g., up to 50% on a molar basis. Preferably, there is used between 0.5 and 5 moles of metal fluoride per 100 moles of the fluoroolefin, or mixture of fluoroolefins, being polymerized.

With the more active catalysts, e.g., cobalt trifluoride or lead tetrafluoride, the polymerization reaction proceeds at temperatures as low as 0° C. and is even exothermic. Preferably, the reaction is carried out at temperatures at least as high as the ambient temperature, e.g., 15-25° C. The maximum temperature is not critical, provided it is below the decomposition point of the fluoroolefin polymer, but it is in general unnecessary to exceed 200° C., and the preferred temperature range is that between 15 and 150° C. Under such conditions, substantial conversions are obtained within one to eight hours.

When employing the most active combinations of catalysts and solvents, e.g., cobalt trifluoride with arsenic trifluoride as the solvent, polymerization can be carried out at atmospheric pressure, for example by passing the gaseous fluoroolefin through the catalyst-solvent mixture. However, better results are in general achieved by operating in sealed pressure vessels, where the pressure can be the autogenous pressure developed at the operating temperature, or any desired pressure, e.g., up to 200 atmospheres or higher, produced by pressuring the fluoroolefin in the vessel.

The reaction can be carried out without the aid of a solvent or diluent, for example by heating a mixture of dry metallic fluoride and fluoroolefin in a sealed vessel. However, better results are obtained by using as the reaction medium a liquid which dissolves at least one of the reactants, metallic fluoride or fluoroolefin, to the extent of at least 5% at 25° C. and which is substantially inert chemically towards the reactants and reaction product. Fluorine-containing liquids boiling above about 15° C. and which have the already mentioned solvent power are particularly suitable. Among these may be mentioned substantially anhydrous hydrogen fluoride, arsenic trifluoride, antimony pentafluoride and the aliphatically saturated fluorocarbons (i.e., compounds containing only carbon and fluorine), such as perfluorodimethylcyclohexane, perfluorotoluene, perfluoroethylcyclopentane, perfluoro-n-octane, perfluoro-m-decane, and the like. Arsenic trifluoride has an excellent combination of properties for use in this process, and it is therefore the preferred reaction medium. The amount of solvent is not critical and may vary, for example, from one-half to twenty times the weight of fluoride catalyst used. Reactants and solvents should be substantially anhydrous.

Under the conditions described, conversions to the polymer are excellent, nearly always above 80% and generally of the order of 90 to 95%. The polymer is conveniently isolated from the reaction mixture by removing the solvent, if any is used, by evaporation, operating under reduced pressure if desired. The polymer can be freed from essentially all the metal fluoride catalyst by washing or extracting it with a suitable solvent, such as water or preferably a strong aqueous acid such as hydrochloric acid, nitric acid or dilute sulfuric acid, which has a hydrolytic action on the metallic fluoride and removes the metal ion. Small amounts of metal, e.g., of the order of 500–2500 parts per million, are harmless for all practical purposes if left in the polymer.

Copolymers of tetrafluoroethylene with perfluoroolefins having a terminal difluoromethylene group and of the general formula $C_nF_{2n}$, where $n$ is an integer at least equal to 3, and preferably from 3 to 10, inclusive, can also be prepared by the process of this invention. In order for a copolymer to form at a practical rate under the conditions described, it is desirable that the copolymerization mixture contain at least 20 mole percent of tetrafluoroethylene. The preferred perfluoroolefins are the straight chain ones having the formula

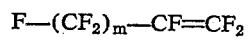

$$F-(CF_2)_m-CF=CF_2$$

where $m$ is an integer from 1 to 8. Specific examples of suitable perfluoroolefins are hexafluoropropene-1, octafluorobutene-1, dodecafluorohexene-1, hexadecafluoroheptene-1 and eicosafluorodecene-1. Such fluoroolefins can be prepared by the method described in U.S. Patent 2,668,864, issued to L. J. Hals, T. S. Reid and G. H. Smith on February 9, 1954. Hexafluoropropene is the preferred perfluoroolefin for copolymerization with tetrafluoroethylene, because it is fairly readily accessible and gives copolymers with an attractive combination of physical properties.

The tetrafluoroethylene polymers or copolymers obtainable by the process of this invention are tough solids of high molecular weight, above 200,000 and generally in the range of 500,000 to 2,000,000, and excellent physical properties, including good thermal stability, which permit them to be used in the various applications for which these polymers are suitable when prepared by conventional means.

The following examples illustrate the invention:

Example I

Into an agitated pressure vessel of about 80 cc. capacity containing 28.3 g. of lead tetrafluoride and 15 cc. of arsenic trifluoride as the solvent was pressured 40 g. of tetrafluoroethylene in portions of 4 g. over a period of 5 hours at room temperature. The vessel was agitated at room temperature (18–23° C.) for an additional hour. The internal pressure during this period did not exceed 350 lb./sq. in. After evaporation of the arsenic trifluoride, the remaining solid product was extracted with acetic acid, then with dilute hydrochloric acid and with dilute nitric acid. The product was then pulverized in a blending mixer and extracted again with acetic acid/nitric acid and acetic acid/hydrochloric acid mixtures. The remaining solid (36.5 g., 91% conversion) was polytetrafluoroethylene which was further identified by its X-ray diffraction pattern. The polymer was found by emission spectroscopy to contain lead at the 500–2500 p.p.m. level.

Example II

A mixture of 14.6 g. of silver difluoride, 15 cc. of arsenic trifluoride and 24 g. of tetrafluoroethylene was agitated in a pressure vessel at a temperature of 66° C. under autogenous pressure. The resulting polytetrafluoroethylene, isolated as in Example I, except that the extractions with hydrochloric acid were omitted, weighed 21.5 g. (90% conversion). Emission spectroscopy indicated the presence of 0.08–0.5% of silver. The molecular weight of this polymer was about 1,600,000 when determined by measuring the specific gravity of a sintered chip.

Example III

A copolymer was prepared by heating a mixture of 7.3 g. of silver difluoride, 15 cc. of arsenic trifluoride, 15.1 g. of tetrafluoroethylene and 34 g. of hexafluoropropene for 10 hours at 70–150° C. in a sealed vessel under autogenous pressure. After treatment of the reaction mixture as in Example II, there was obtained 12.5 g. of a solid product having an inherent viscosity at 380° C. of $5.36 \times 10^5$ poises under a 5 kg. load. Tough films of this product were pressed at 345° C. The infrared spectrum of one of such film showed the presence of —$CF_3$ and —CF— groups, establishing the identity of the material as a tetrafluoroethylene/hexafluoropropene copolymer.

Example IV

A mixture of 1.2 g. of cobalt trifluoride and 15 cc. of arsenic trifluoride was maintained for 14 hours in an agitated pressure vessel at a temperature varying from 25–90° C. while 29 g. of tetrafluoroethylene was added in portions. The internal pressure did not exceed 300 lb./sq. in. The resulting polytetrofluoroethylene, isolated as in Example I, weighed 27.5 g. (95% conversion). Emission spectroscopy indicated that 200–1000 p.p.m. of cobalt was present in the polymer. The molecular weight was found to be about 1,700,000.

Example V

A mixture of 1.2 g. of cobalt trifluoride and 15 cc. of anhydrous hydrogen fluoride as the solvent was held in an agitated pressure vessel at 25° C. for 5 hours while 29.9 g. of tetrafluoroethylene was injected at such a rate as to keep the internal pressure being below 300 lb./sq. in. After purifying the reaction product by extraction with nitric acid and sulfuric acid, there was obtained 25.5 g. (92% conversion) of polytetrafluoroethylene.

Example VI

A mixture of 6.0 g. of cobalt trifluoride, 15 cc. of perfluorodimethylcyclohexane as the solvent and 30.4 g. of tetrafluoroethylene was heated at 150° C. for 10 hours in an agitated pressure vessel under autogenous pressure. After removal of the solvent by filtration and purification of the solid residue by extraction with nitric acid and hydrochloric acid, there was obtained 28.6 g. (94% conversion) of polytetrafluoroethylene.

Example VII

A mixture of 2.8 g. of lead tetrafluoride, 15 cc. of arsenic trifluoride, and 43 g. of tetrafluoroethylene was heated in an agitated pressure vessel at 25–90° C. for 10 hours under autogenous pressure. The reaction product was combined with that from a similar run and, after removal of the solvent by evaporation, the solid residue was purified by treatment with concentrated nitric acid, then with dilute hydrochloric acid. There was obtained 73 g. (88% conversion) of polytetrafluoroethylene.

This invention provides a convenient method for preparing polytetrafluoroethylene and certain copolymers thereof in excellent yields and under relatively low temperature and pressure conditions.

I claim:

1. A process for preparing perfluorocarbon polymer which comprises contacting under anhydrous conditions at a temperature of at least 0° C. under a pressure of at least one atmosphere, (A) monomeric terminally unsaturated perfluoroolefin comprising at least 20 mole percent tetrafluoroethylene, and (B) a catalytic amount of metal fluoride, said metal being one having a higher oxidative potential than mercury, selected from the group consisting of chromium, manganese, cerium, lead, bismuth, cobalt and silver, and being present in its highest valency state.

2. Process of claim 1 wherein the amount of metal fluoride is in the range of 0.5 to 5 moles per 100 moles of (A).

3. Process of claim 1 wherein the temperature is in the range of 15° C. to 150° C.

4. Process of claim 1 wherein the pressure is superatmospheric.

5. Process of claim 1 wherein there is present, (C) a liquid which forms a solution containing at least 5 weight percent of at least one of (A) and (B) at 25° C., and is substantially chemically inert under the reaction conditions towards (A) and (B) and the reaction product.

6. A process for preparing perfluorocarbon polymer which comprises contacting under anhydrous conditions at a temperature in the range of 15 to 150° C. under superatmospheric pressure (A) monomeric terminally unsaturated perfluoroolefin comprising at least 20 mole percent tetrafluoroethylene and (B) 0.5 to 5 moles, per 100 moles of (A), of metal fluoride, said metal being one having a higher oxidation potential than mercury, selected from the group consisting of chromium, manganese, cerium, lead, bismuth, cobalt and silver, and being present in its highest valency state; in the presence of (C) a liquid which forms a solution containing at least 5 weight percent of at least one of (A) and (B) and is substantially chemically inert under the reaction conditions towards (A) and (B) and the reaction product.

7. Process of claim 6 wherein (A) consists of tetrafluoroethylene.

8. Process of claim 6 wherein (A) is a mixture of tetrafluoroethylene and terminally unsaturated perfluoroolefin of general formula $C_nF_{2n}$, wherein $n$ is an integer of from 3 to 10, inclusive.

9. Process of claim 6 wherein (B) is cobalt trifluoride.

10. Process of claim 6 wherein (C) is arsenic trifluoride.

11. Process of claim 6 wherein (B) is lead tetrafluoride.

12. Process of claim 8 wherein (A) is a mixture of tetrafluoroethylene and hexafluoropropylene.

References Cited in the file of this patent

UNITED STATES PATENTS

| 2,549,935 | Sauer | Apr. 24, 1951 |
| 2,569,524 | Hamilton | Oct. 2, 1951 |

OTHER REFERENCES

Industrial & Engineering Chemistry, vol. 39, pages 290–354, March 1947.